United States Patent
Han

(10) Patent No.: US 9,983,751 B2
(45) Date of Patent: May 29, 2018

(54) TOUCH SENSING UNIT, DISPLAY DEVICE AND FABRICATION METHOD OF THE TOUCH SENSING UNIT

(71) Applicant: Samsung Display Co., Ltd., Yongin-si (KR)

(72) Inventor: Jiwon Han, Anyang-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 25 days.

(21) Appl. No.: 15/182,196

(22) Filed: Jun. 14, 2016

(65) Prior Publication Data

US 2017/0147103 A1 May 25, 2017

(30) Foreign Application Priority Data

Nov. 20, 2015 (KR) .................. 10-2015-0163491

(51) Int. Cl.
*G06F 3/044* (2006.01)
*G06F 1/16* (2006.01)

(52) U.S. Cl.
CPC ............ *G06F 3/044* (2013.01); *G06F 1/1652* (2013.01); *G06F 2203/04102* (2013.01); *G06F 2203/04103* (2013.01); *G06F 2203/04108* (2013.01); *G06F 2203/04111* (2013.01); *G06F 2203/04112* (2013.01)

(58) Field of Classification Search
CPC ...... G06F 1/1652; G06F 3/041; G06F 3/0412; G06F 3/0416; G06F 3/044; G06F 2203/04102; G06F 2203/04103; G06F 2203/04108; G06F 2203/04111; G06F 2203/04112; H01L 51/0541; H01L 51/0545; H01L 51/105; H01L 51/0074; H01L 51/052

See application file for complete search history.

(56) References Cited

U.S. PATENT DOCUMENTS

| 2010/0032662 | A1* | 2/2010 | Whiting | ............. H01L 51/052 257/40 |
| 2013/0292167 | A1* | 11/2013 | Schmid | ............. B82Y 30/00 174/260 |
| 2014/0293143 | A1* | 10/2014 | Yang | ............. G06F 1/1643 349/12 |

(Continued)

FOREIGN PATENT DOCUMENTS

| JP | 3283937 | 5/2002 |
| JP | 5703431 | 4/2015 |

(Continued)

OTHER PUBLICATIONS

Abrabham Ulman, "Formation and Structure of Self-Assembled Monolayer", XP-002116022, Department off Chemical Engineering, Chemistry ad Materials Science, Chemical Reviews, 1996, vol. 96, No. 4, pp. 1533-1554.

*Primary Examiner* — Nathan Danielsen
(74) *Attorney, Agent, or Firm* — H.C. Park & Associates, PLC

(57) ABSTRACT

A touch sensing unit including an insulating layer and a conductive pattern. The insulating layer includes a first inorganic insulating layer and a first self-assembled monolayer (SAM). The first self-assembled monolayer is disposed on the first inorganic insulating layer.

19 Claims, 14 Drawing Sheets

(56) References Cited

U.S. PATENT DOCUMENTS

| | | | |
|---|---|---|---|
| 2015/0036257 A1* | 2/2015 | Cheng | G06F 1/1652 361/220 |
| 2015/0059969 A1 | 3/2015 | Han | |
| 2015/0064367 A1* | 3/2015 | Choi | G06F 3/0412 428/1.31 |
| 2015/0199043 A1 | 7/2015 | Park et al. | |
| 2016/0152002 A1 | 6/2016 | Inui et al. | |

FOREIGN PATENT DOCUMENTS

| | | |
|---|---|---|
| KR | 10-2011-0016346 | 2/2011 |
| KR | 10-2014-0076607 | 6/2014 |
| KR | 10-2015-0020929 | 2/2015 |
| KR | 10-2015-0026608 | 3/2015 |
| WO | 2014/207952 | 12/2014 |

\* cited by examiner

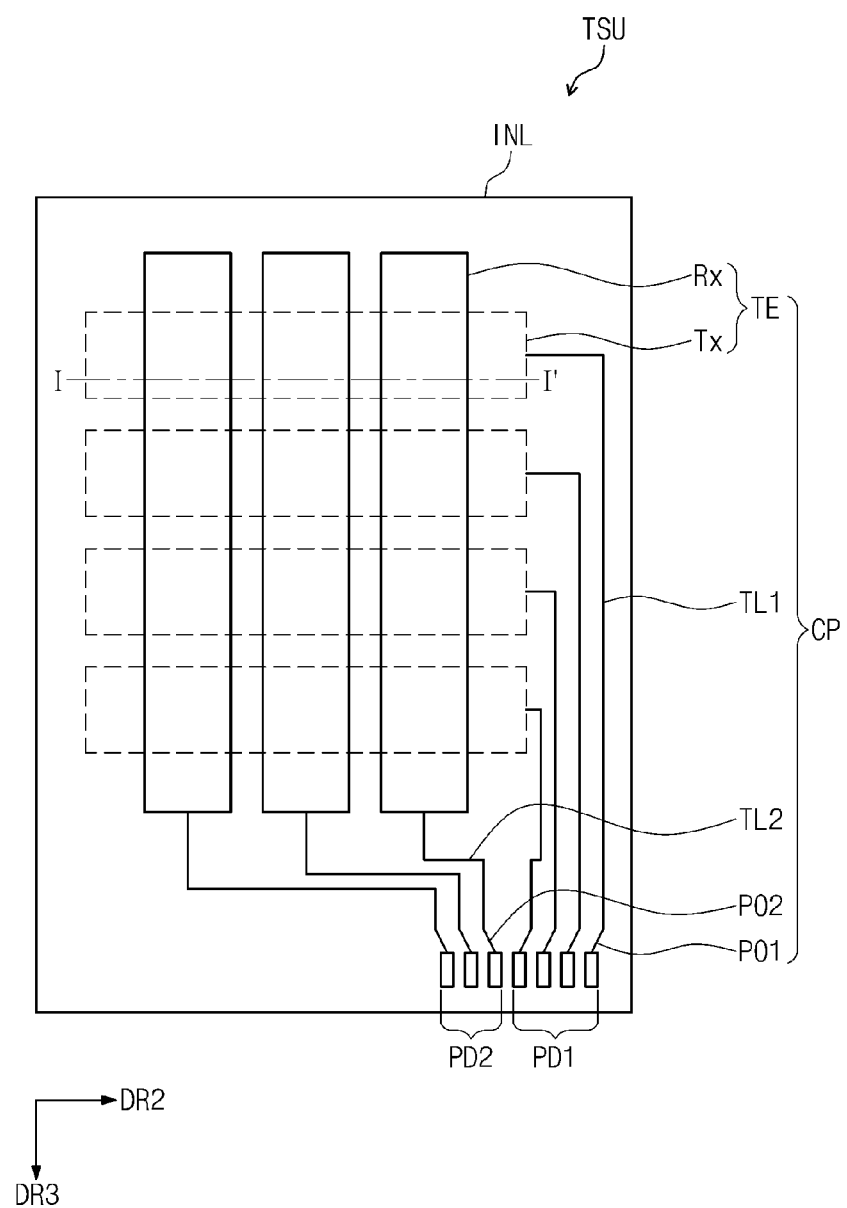

TOUCH SENSING UNIT, DISPLAY DEVICE AND FABRICATION METHOD OF THE TOUCH SENSING UNIT

CROSS-REFERENCE TO RELATED APPLICATION[S]

This application claims priority from and the benefit of Korean Patent Application No. 10-2015-0163491, filed on Nov. 20, 2015, which is hereby incorporated by reference for all purposes as if fully set forth herein.

BACKGROUND

Field

Exemplary embodiments relate to a touch sensing unit, a display device and a method of fabricating the touch sensing unit. More particularly, exemplary embodiments relate to a touch sensing unit which may prevent the propagation of cracks generated by bending and provide a slim profile, a display device and a method of fabricating the touch sensing unit.

Discussion of the Background

A display device provides users with information by displaying various images. The display device may include a display panel and a touch sensing unit. Recently, a bendable display device has been developed. In contrast to a flat display device, a flexible display device may be folded, wrapped or bent. The flexible display device having a shape which may be varied may be portable and improve user convenience.

A touch sensing unit is an input device capable of inputting the orders of a user by selecting instructions from a menu shown on a screen, such as a display panel, by using the user's hand or an object. The touch sensing unit is provided, for example, on the front face of a display panel and converts contact positions, where the user's hand or the object make direct contact, to electrical signals. Accordingly, the instruction menu selected at the contact position is recognized as an input signal. Such a touch sensing unit may replace a separate input device connected to a display panel and operate, such as a keyboard and a mouse, and the range of use thereof is gradually expanded.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensing unit which may provide a slim profile and prevent the propagation of cracks resulting from a bending movement.

Exemplary embodiments also provide a display device which may provide a slim profile and prevent the propagation of cracks resulting from a bending movement.

Exemplary embodiments also provide a method of fabricating a touch sensing unit which may provide a slim profile and prevent the propagation of cracks resulting from a bending movement.

Additional aspects will be set forth in the detailed description which follows, and, in part, will be apparent from the disclosure, or may be learned by practice of the inventive concept.

An exemplary embodiment discloses a touch sensing unit including an insulating layer and a conductive pattern. The insulating layer includes a first inorganic insulating layer, a first self-assembled monolayer (SAM), and a second inorganic insulating layer. The self-assembled monolayer is disposed on the first inorganic insulating layer. The second inorganic insulating layer is disposed on the first self-assembled monolayer.

An exemplary embodiment also discloses a display device including a display panel and a touch sensing unit. The touch sensing unit is disposed on the display panel. The touch sensing unit includes an insulating layer and a conductive pattern. The insulating layer includes a first inorganic insulating layer, a first self-assembled monolayer, and a second inorganic insulating layer. The first self-assembled monolayer is disposed on the first inorganic insulating layer. The second inorganic insulating layer is disposed on the first self-assembled monolayer.

An exemplary embodiment also discloses a method of fabricating a touch sensing unit, including forming an insulating layer and forming a conductive pattern making contact with the insulating layer. The forming of the insulating layer includes forming a first inorganic insulating layer, forming a first self-assembled monolayer on the first inorganic insulating layer, and forming a second inorganic insulating layer on the first self-assembled monolayer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 2A is a schematic plan view of a touch sensing unit according to an exemplary embodiment of the inventive concept.

DETAILED DESCRIPTION OF THE ILLUSTRATED EMBODIMENTS

Figure 1A:
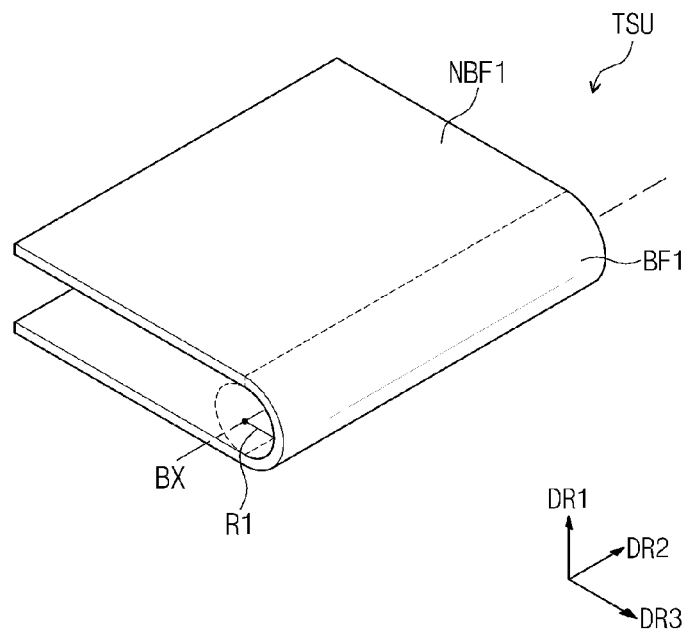
FIG. 1A and FIG. 1B are perspective views schematically illustrating a touch sensing unit according to an exemplary embodiment of the inventive concept.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
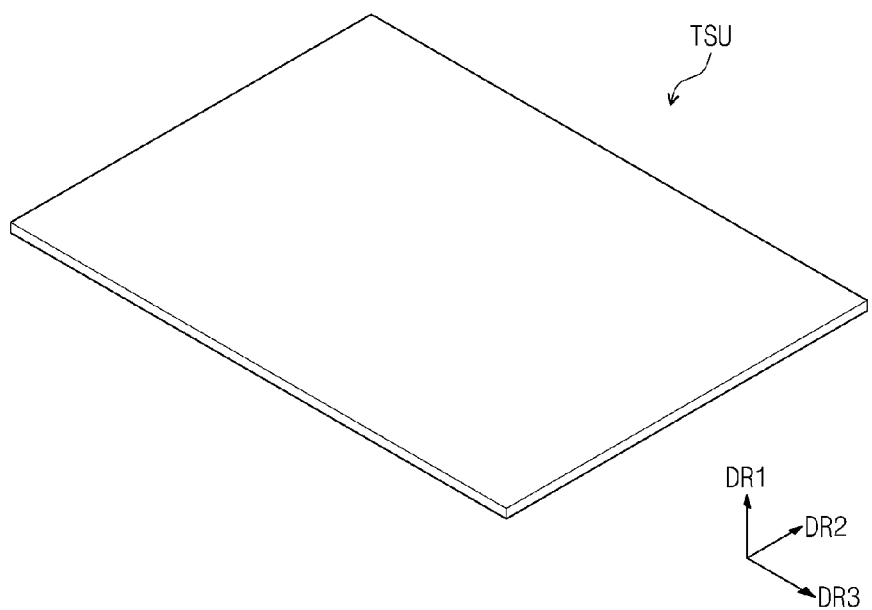

FIGS. 1A and 1B are perspective views schematically illustrating a touch sensing unit according to an exemplary embodiment of the inventive concept.

Referring to FIGS. 1A and 1B, a touch sensing unit TSU according to an exemplary embodiment may be operated in a first mode or a second mode. Referring to FIG. 1A, the touch sensing unit TSU may be bent in one direction based on a bending axis BX in the first mode. Referring to FIG. 1B, the touch sensing unit TSU may be unbent in the second mode. Bending may refer to the bending of the touch sensing unit TSU to a certain shape as a result of an external force.

In FIG. 1A, the distance between the facing sides of the touch sensing unit TSU is constant when the touch sensing unit TSU is bent about the bending axis BX. However, the inventive concept is not limited thereto, and the distance between the facing sides of the touch sensing unit TSU by bending may not be constant. In addition, the areas of the facing sides of the touch sensing unit TSU when the touch sensing unit TSU is bent based on the bending axis BX in the first direction are the same. However, the inventive concept is not limited thereto, and the areas of the facing sides of the touch sensing unit TSU by bending may be different from each other.

Referring again to FIGS. 1A and 1B, the touch sensing unit TSU may include a touch bending part BF1 and a touch non-bending part NBF1. The touch bending part BF1 may be bent based on the bending axis BX extended in a second direction DR2 in the first mode. The touch bending part BF1 may be unbent in the second mode.

One side of the touch bending part BF1 may have a first radius of curvature R1. The first radius of curvature R1 may be in a range of, for example, about 1 mm to about 10 mm. The touch non-bending part NBF1 may be connected to the touch bending part BF1. The touch non-bending part NBF1 is not bent in both the first mode and the second mode.

The touch sensing unit TSU may recognize the direct touch of a user, the indirect touch of a user, the direct touch of an object, or the indirect touch of an object. The direct touch means that a user or an object makes direct touch with the touch sensing unit TSU. The indirect touch means that the touch sensing unit TSU recognizes as being touched even though a user or an object does not make direct touch with the touch sensing unit TSU however is positioned at a distance where the touch sensing unit TSU may recognize the user or the object as being touched.

Figure 2B:
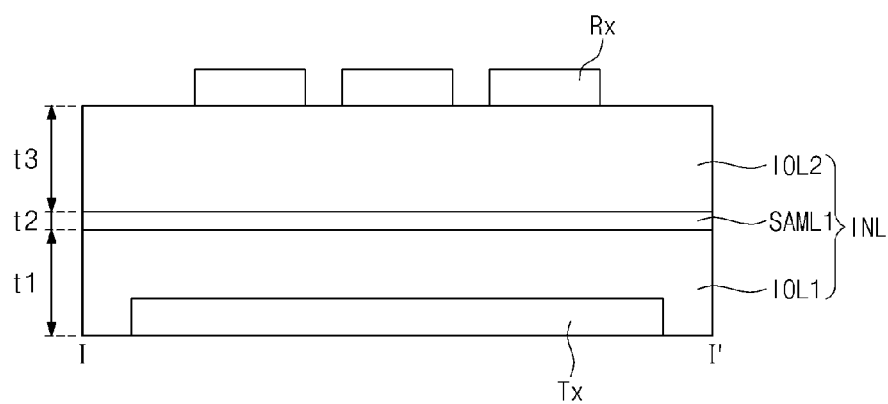
FIG. 2B is a schematic cross-sectional view corresponding to line I-I' in FIG. 2A.
Figure 2C:
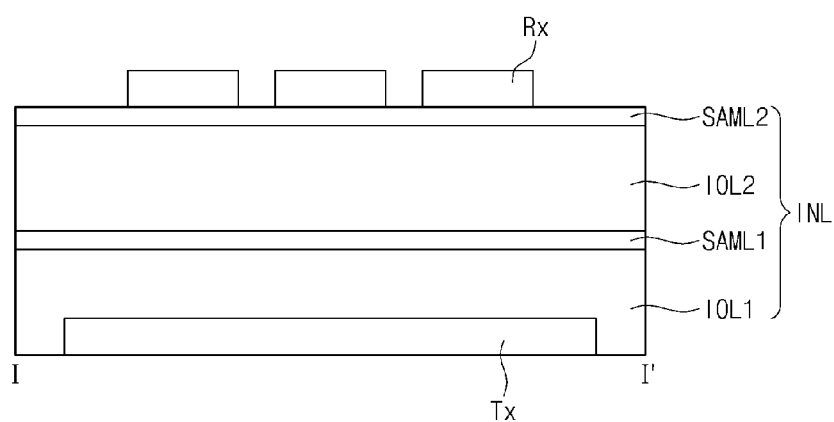
FIG. 2C is a schematic cross-sectional view corresponding to line I-I' in FIG. 2A.

FIG. 2A is a schematic plan view of a touch sensing unit according to an exemplary embodiment of the inventive concept. FIG. 2B is a schematic cross-sectional view corresponding to line I-I' in FIG. 2A. FIG. 2C is a schematic cross-sectional view corresponding to line I-I' in FIG. 2A.

Figure 3A:
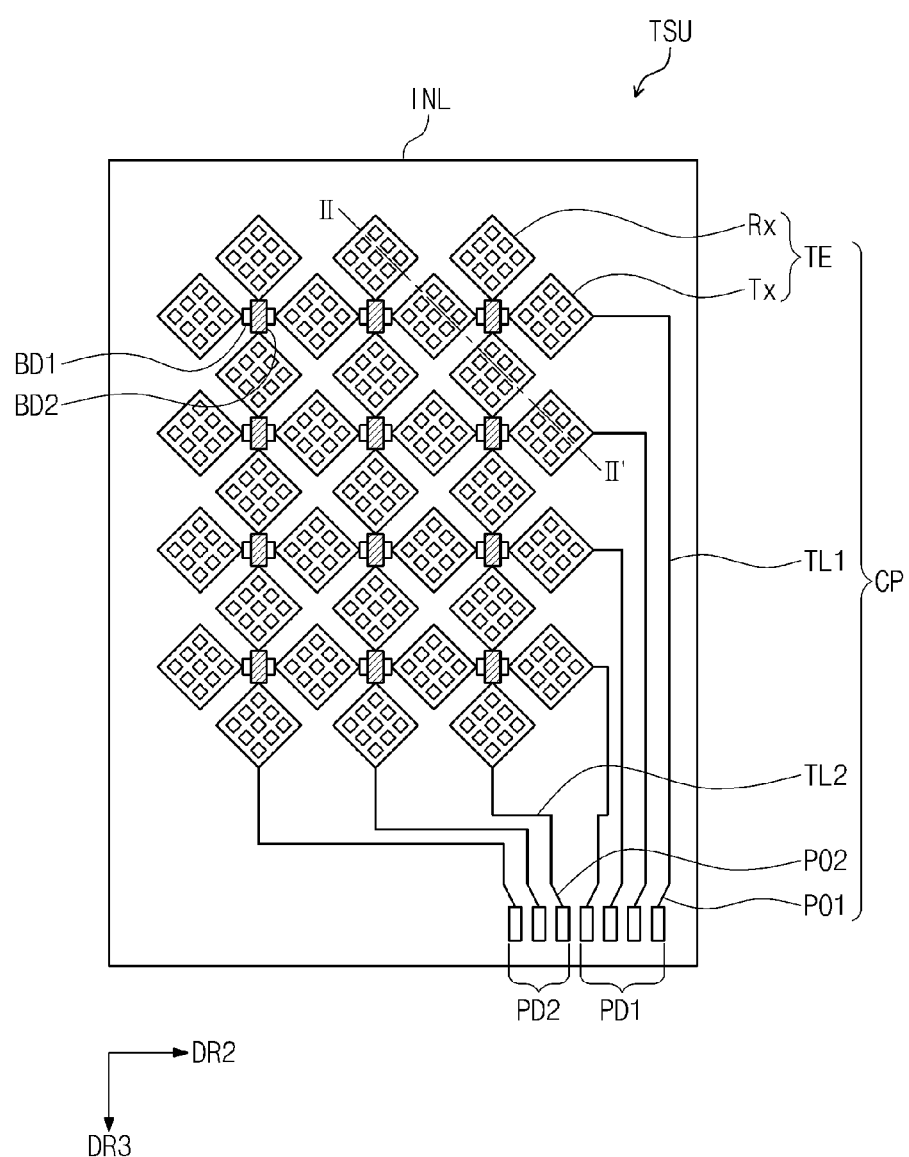
FIG. 3A is a schematic plan view of a touch sensing unit according to an exemplary embodiment of the inventive concept.
Figure 3B:
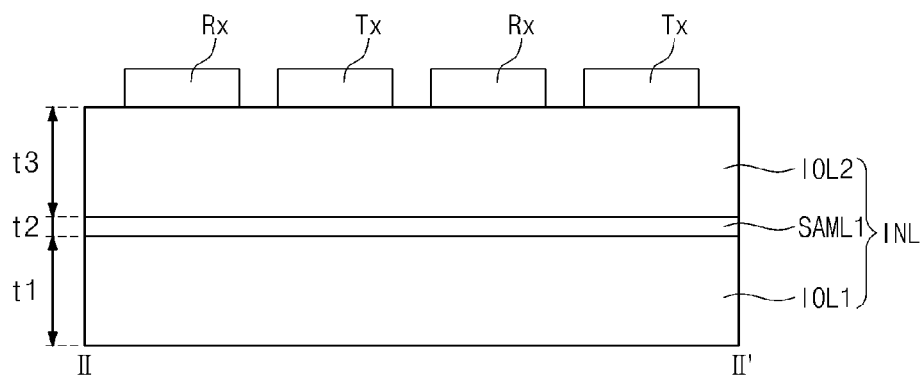
FIG. 3B is a schematic cross-sectional view corresponding to line II-II' in FIG. 3A.
Figure 3C:
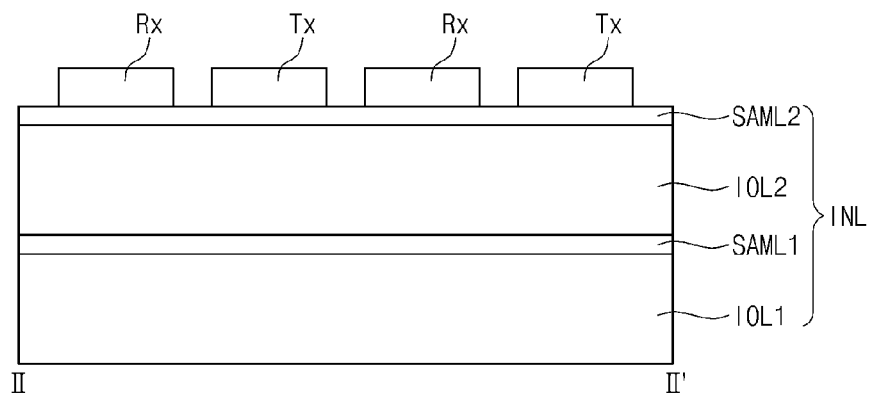
FIG. 3C is a schematic cross-sectional view corresponding to line II-II' in FIG. 3A.

FIG. 3A is a schematic plan view of a touch sensing unit according to an exemplary embodiment of the inventive concept. FIG. 3B is a schematic cross-sectional view corresponding to line II-II' in FIG. 3A. FIG. 3C is a schematic cross-sectional view corresponding to line II-II' in FIG. 3A.

Referring to FIGS. 2A to 2C and 3A to 3C, a touch sensing unit TSU includes an insulating layer INL and a conductive pattern CP. The insulating layer INL may be bent in a first mode and unbent in a second mode. The insulating layer INL includes a first inorganic insulating layer IOL1, a first self-assembled monolayer SAML1, and a second inorganic insulating layer IOL2.

The first inorganic insulating layer IOL1 includes a first inorganic insulating material. The thickness t1 of the first inorganic insulating layer IOL1 may be greater than the thickness t2 of the first self-assembled monolayer SAML1. The thickness t1 of the first inorganic insulating layer IOL1 may be in a range of, for example, about 100 nm to about 3,000 nm.

The first self-assembled monolayer SAM1 may include silicon. The first self-assembled monolayer SAML1 may include a silane compound. The first self-assembled monolayer SAML1 may include any materials commonly used, without limitation, and may include, for example, at least one of (3-aminopropyl)trimethoxysilane (APS), 11-mercaptoundecanoic acid (MUA), (3-trimethoxysilylpropyl)diethylenetriamine (DET), N-(2-aminoethyl)-3-aminopropyltrimethoxysilane (EDA), perfluorodecyltrichlorosilane (PFS), octadecyltrichlorosilane (OTS), octadecyltrimethoxysilane (OTMS), 1-Hexadecanethiol (HDT), (heptadecafluoro-1,1,2,2,-tetrahydrodecyl)trichlorosilane (FDTS), 1H,1H,2H,2H-perfluorodecyltrichlorosilane-perfluorodecyltrichlorosilane (FOTS), pentafluorobenzenethiol (PFBT), or dichlorodimethylsilane (DDMS).

The thickness t2 of the first self-assembled monolayer SAML1 may be less than each of the thickness t1 of the first inorganic insulating layer IOL1 and the thickness t3 of the second inorganic insulating layer IOL2. The thickness t2 of the first self-assembled monolayer SAML1 may be in a range of, for example, about 1 nm to about 10 nm.

The touch sensing unit according to an exemplary embodiment of the inventive concept has been explained illustrating the first self-assembled monolayer SAML1 with a single layer. However, the first self-assembled monolayer SAML1 may have a multilayer.

Generally, cracks may be generated in the inorganic insulating layer due to bending. The cracks generated in the inorganic insulating layer are propagated within the inorganic insulating layer. The first self-assembled monolayer SAML1 is an organic insulating layer, and may prevent the propagation of the cracks generated in the inorganic insulating layer.

The second inorganic insulating layer IOL2 is disposed on the first self-assembled monolayer SAML1. The second inorganic insulating layer IOL2 includes a second inorganic insulating material. The second inorganic insulating material may be the same as, or different from, the first inorganic insulating material.

The thickness t3 of the second inorganic insulating layer IOL2 may be the same as, or different from, the thickness t1 of the first inorganic insulating layer IOL1. The thickness t3 of the second inorganic insulating layer IOL2 may be greater than the thickness t2 of the first self-assembled monolayer SAML1. The thickness t3 of the second inorganic insulating layer IOL2 may be in a range of, for example, about 100 nm to about 3,000 nm.

Referring to FIGS. 2C and 3C, the insulating layer INL may further include a second self-assembled monolayer SAML2. The second self-assembled monolayer SAML2 may be disposed on the second inorganic insulating layer IOL2.

The second self-assembled monolayer SAML2 may include silicon. The second self-assembled monolayer SAML2 may include a silane compound. The second self-assembled monolayer SAML2 may include any materials commonly used, without limitation, and may include, for example, at least one of (3-aminopropyl)trimethoxysilane (APS), 11-mercaptoundecanoic acid (MUA), (3-trimethoxysilylpropyl)diethylenetriamine (DET), N-(2-aminoethyl)-3-aminopropyltrimethoxysilane (EDA), perfluorodecyltrichlorosilane (PFS), octadecyltrichlorosilane (OTS), octadecyltrimethoxysilane (OTMS), 1-Hexadecanethiol (HDT), (heptadecafluoro-1,1,2,2,-tetrahydrodecyl)trichlorosilane (FDTS), 1H,1H,2H,2H-perfluorodecyltrichlorosilane-perfluorodecyltrichlorosilane (FOTS), pentafluorobenzenethiol (PFBT), or dichlorodimethylsilane (DDMS).

The thickness of the second self-assembled monolayer SAML2 may be less than the thickness t1 of the first inorganic insulating layer IOL1 and the thickness t3 of the second inorganic insulating layer IOL2.

In FIGS. 2B and 3B, an exemplary embodiment including two inorganic insulating layers and one self-assembled monolayer is illustrated, and in FIGS. 2C and 3C, an exemplary embodiment including two inorganic insulating layers and two self-assembled monolayers is illustrated. However, the inventive concept is not limited thereto, and the number of inorganic insulating layers may be two or more, and the number of self-assembled monolayers may be two or more.

Referring again to FIGS. 2A to 2C and 3A to 3C, the conductive pattern CP makes contact with the insulating layer INL. Referring to FIGS. 2A, 2B, 3A and 3B, the conductive pattern CP may make contact with at least one of the first inorganic insulating layer IOL1 or the second inorganic insulating layer IOL2. Referring to FIGS. 2A, 2C, 3A and 3C, the conductive pattern CP may make contact with at least one of the first inorganic insulating layer IOL1 or the second self-assembled monolayer SAML2.

More particularly, referring to FIGS. 2A and 2B, the conductive pattern CP makes contact with each of the first inorganic insulating layer IOL1 and the second inorganic insulating layer IOL2. Referring to FIGS. 2A and 2C, the conductive pattern CP makes contact with each of the first inorganic insulating layer IOL1 and the second self-assembled monolayer SAML2. Referring to FIGS. 3A and 3B, the conductive pattern CP makes contact with the second inorganic insulating layer IOL2. Referring to FIGS. 3A and 3C, the conductive pattern CP makes contact with the second self-assembled monolayer SAML2.

The conductive pattern CP may be bent in the first mode and unbent in the second mode. At least a portion of the conductive pattern CP is included in the touch bending part (BF1 in FIG. 1A). The conductive pattern CP may also be included in the touch non-bending part (NBF1 in FIG. 1A).

The conductive pattern CP may include a sensing electrode TE, interconnect wirings TL1 and TL2, fanout wirings OP1 and OP2, and pad parts PD1 and PD2. Referring to FIGS. 3A to 3C, the conductive pattern CP may further include bridges BD1 and BD2.

Referring again to FIGS. 2A to 2C and 3A to 3C, the sensing electrode TE includes first sensing electrodes Tx and second sensing electrodes Rx. The first sensing electrodes Tx and the second sensing electrodes Rx are electrically insulated from each other. Each of the first sensing electrodes Tx and the second sensing electrodes Rx may have various shapes, such as a rhombus, a square, a rectangle, a circle, or a shape without a structure (for example, a shape of entangled branches such as a dendrite structure). Each of the first sensing electrodes Tx and the second sensing electrodes Rx may have a mesh shape.

Each of the first sensing electrodes Tx and the second sensing electrodes Rx may be any commonly used ones without specific limitation, and may include at least one of, for example, a metal, an alloy or a transparent conductive oxide. Each of the first sensing electrodes Tx and the second sensing electrodes Rx may include at least one of, for example, Cu, Ti, Al, Ag, Au, Pt, Mo, an alloy of silver, palladium and copper (APC), an alloy of silver and palladium (AP), indium tin oxide (ITO), indium zinc oxide (IZO), or indium gallium zinc oxide (IGZO). Each of the metal and the alloy may have various shapes, such as a sphere shape and a wire shape.

With direct touch or indirect touch, for example, the change of capacitance may be generated between the first sensing electrodes Tx and the second sensing electrodes Rx included in the sensing electrode TE. According to the change of the capacitance, sensing signals applied to the first sensing electrodes Tx may be delayed and provided to the second sensing electrodes Rx. The touch sensing unit TSU may sense a touch coordinate from the delayed values of the sensing signals.

In the touch sensing unit TSU according to an exemplary embodiment of the inventive concept, the touch sensing unit TSU may be driven as a capacitive-type. However, the inventive concept is not limited thereto, and the touch sensing unit TSU may be driven as a resistive-type. In addition, the touch sensing unit TSU may be driven as one of a self-cap type or a mutual-cap type.

Referring to FIGS. 2A to 2C, the first sensing electrodes Tx and the second sensing electrodes Rx may be disposed in different layers. The first sensing electrodes Tx may extend in a second direction DR2 and may be separated in a third direction DR3. The first sensing electrodes Tx are disposed under the insulating layer INL. The first sensing electrodes Tx make contact with the first inorganic insulating layer IOL1. The first sensing electrodes Tx are covered with the first inorganic insulating layer IOL1.

The second sensing electrodes Rx may extend in the third direction DR3 and may be separated in the second direction DR2 from each other. The second sensing electrodes Rx are disposed on the first sensing electrodes Tx. The second sensing electrodes Rx are disposed on the insulating layer INL. The second sensing electrodes Rx make contact with the second inorganic insulating layer IOL2.

Referring to FIGS. 3A to 3C, the first sensing electrodes Tx and the second sensing electrodes Rx may be disposed in the same layer. Each of the first sensing electrodes Tx and the second sensing electrodes Rx may be disposed on the insulating layer INL. The first sensing electrodes Tx and the second sensing electrodes Rx are separated from each other on the same plane.

The first sensing electrodes Tx may be separated in the second direction DR2 and the third direction DR3. The first sensing electrodes Tx separated in the second direction DR2 are connected by a first bridge BD1. The second sensing electrodes Rx may be separated in the second direction DR2 and the third direction DR3. The second sensing electrodes Rx separated in the third direction DR3 are connected by a second bridge BD2. The second bridge BD2 may be disposed on the first bridge BD1. Although not shown, an insulating layer INL may be disposed between the second bridge BD2 and the first bridge BD1.

The first sensing electrodes Tx and the second sensing electrodes Rx are disposed on the insulating layer INL. Each of the first sensing electrodes Tx and the second sensing electrodes Rx makes contact with the second inorganic insulating layer IOL2.

Referring again to FIGS. 2A to 2C and 3A to 3C, the interconnect wirings TL1 and TL2 make electrical connection with the sensing electrode TE. The interconnect wirings TL1 and TL2 include first interconnect wirings TL1 and second interconnect wirings TL2. The first interconnect wirings TL1 may be connected with the first sensing electrodes Tx and first fanout wirings PO1. The second interconnect wirings TL2 may be connected with the second sensing electrodes Rx and second fanout wirings PO2.

The fanout wirings PO1 and PO2 are connected with the interconnect wirings TL1 and TL2 and the pad parts PD1 and PD2. The fanout wirings PO1 and PO2 include first fanout wirings PO1 and second fanout wirings PO2. The first fanout wirings PO1 are connected with the first interconnect wirings TL1 and the first pad part PD1. The second fanout wirings PO2 are connected with the second interconnect wirings TL2 and the second pad part PD2.

The pad parts PD1 and PD2 are electrically connected with the sensing electrode TE. The pad parts PD1 and PD2 include a first pad part PD1 and a second pad part PD2. The first pad part PD1 is connected with the first fanout wirings PO1. The first pad part PD1 may be electrically connected with the first sensing electrodes Tx. The second pad part PD2 is connected with the second fanout wirings PO2. The second pad part PD2 may be electrically connected with the second sensing electrodes Rx.

A typical touch sensing unit of the prior art does not include a first self-assembled monolayer within an inorganic insulating layer, and in case cracks are generated due to bending, the cracks may propagate to the whole inorganic insulating layer.

However, the touch sensing unit according to an exemplary embodiment of the inventive concept includes a first self-assembled monolayer disposed between a first inorganic insulating layer and a second inorganic insulating layer. Accordingly, even though cracks may be generated in the first inorganic insulating layer or the second inorganic insulating layer, the first self-assembled monolayer may prevent the propagation of the cracks. Therefore, the touch sensing unit according to an exemplary embodiment may have high durability.

In addition, the touch sensing unit according to an exemplary embodiment uses the first self-assembled monolayer as an organic insulating layer, and may have a decreased thickness of the insulating layer when compared to a case when using an organic insulating layer other than the first self-assembled monolayer.

Hereinafter, a display device according to an exemplary embodiment will be explained. Hereinafter, parts other than, or in addition to, the touch sensing unit according to above-described exemplary embodiment will mainly be discussed.

Figure 4A:
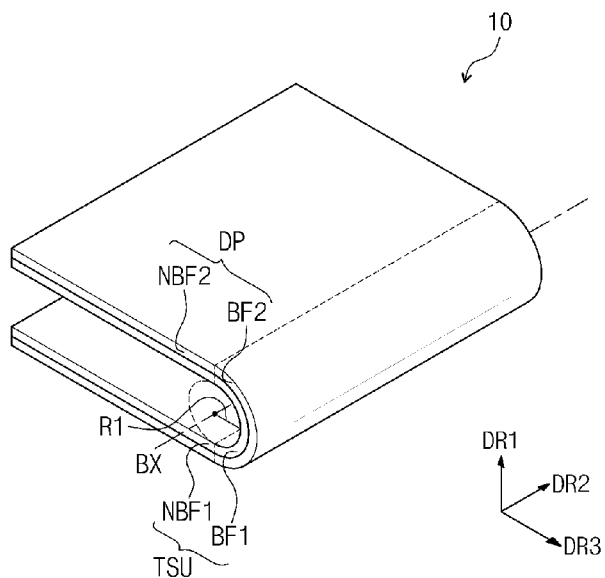
FIG. 4A and FIG. 4B are perspective views schematically illustrating a display device according to an exemplary embodiment of the inventive concept.
Figure 4B:
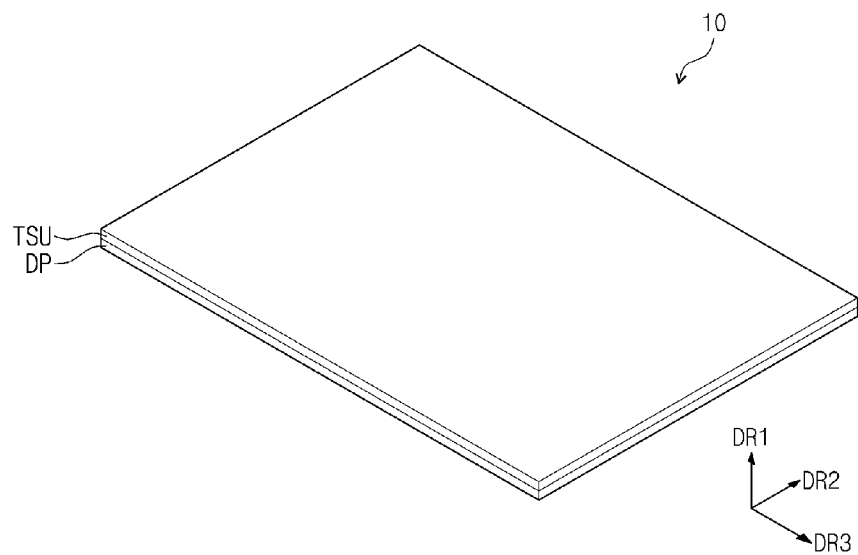

FIGS. 4A and 4B are perspective views schematically illustrating a display device according to an exemplary embodiment of the inventive concept.

Referring to FIGS. 4A and 4B, a display device according to an exemplary embodiment of the inventive concept includes a display panel and a touch sensing unit. A display panel DP includes a display bending part BF2 and a display non-bending part NBF2. The display bending part BF2 is bent based on a bending axis BX extended in a second direction DR2 in a first mode. The display bending part BF2 is unbent in a second mode. The display non-bending part NBF2 is connected with the display bending part BF2. The display non-bending part NBF2 is not bent in both the first mode and the second mode.

Hereinafter, an exemplary embodiment of a display panel DP is an organic light-emitting display panel. However, the inventive concept is not limited thereto and may include a liquid crystal display panel, a plasma display panel, an electrophoretic display panel, a microelectromechanical system (MEMS) display panel, or an electrowetting display panel.

A touch sensing unit TSU includes a touch bending part BF1 and a touch non-bending part NBF1. The touch bending part BF1 is bent based on the bending axis BX extended in the second direction DR2 in a first mode. The touch bending part BF1 is unbent in the second mode. At least a portion of the conductive pattern (CP in FIGS. 2A and 3A) is included in the touch bending part BF1. The conductive pattern (CP in FIGS. 2A and 3A) may be included in the touch non-bending part NBF1.

One side of the touch bending part BF1 may have a first radius of curvature R1. The first radius of curvature R1 may be in a range of, for example, about 1 mm to about 10 mm. The touch non-bending part NBF1 is connected with the touch bending part BF1. The touch non-bending part NBF1 is not bent in both the first mode and the second mode.

Figure 5A:
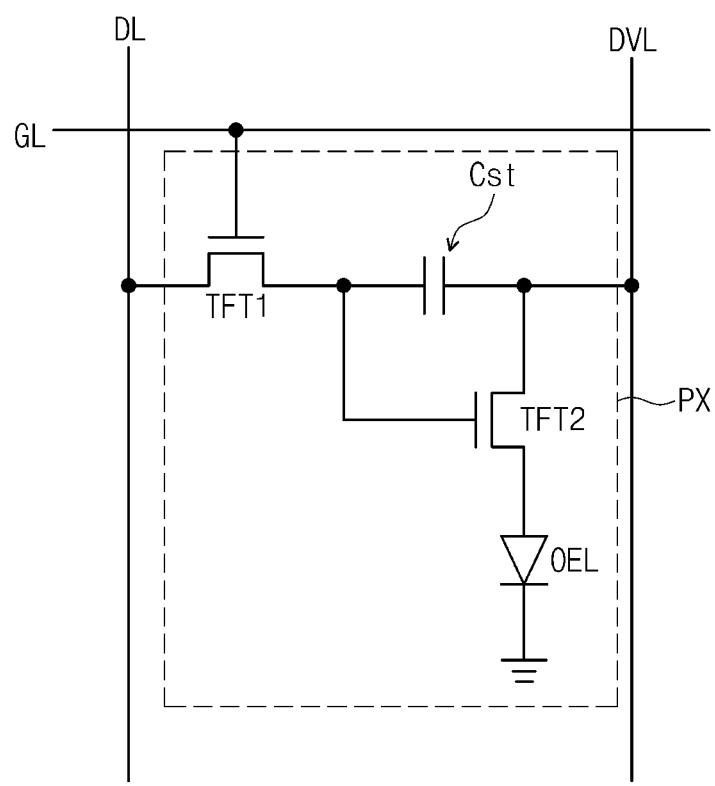
FIG. 5A is a circuit diagram of one pixel included in a display panel included in a display device according to an exemplary embodiment of the inventive concept.
Figure 5B:
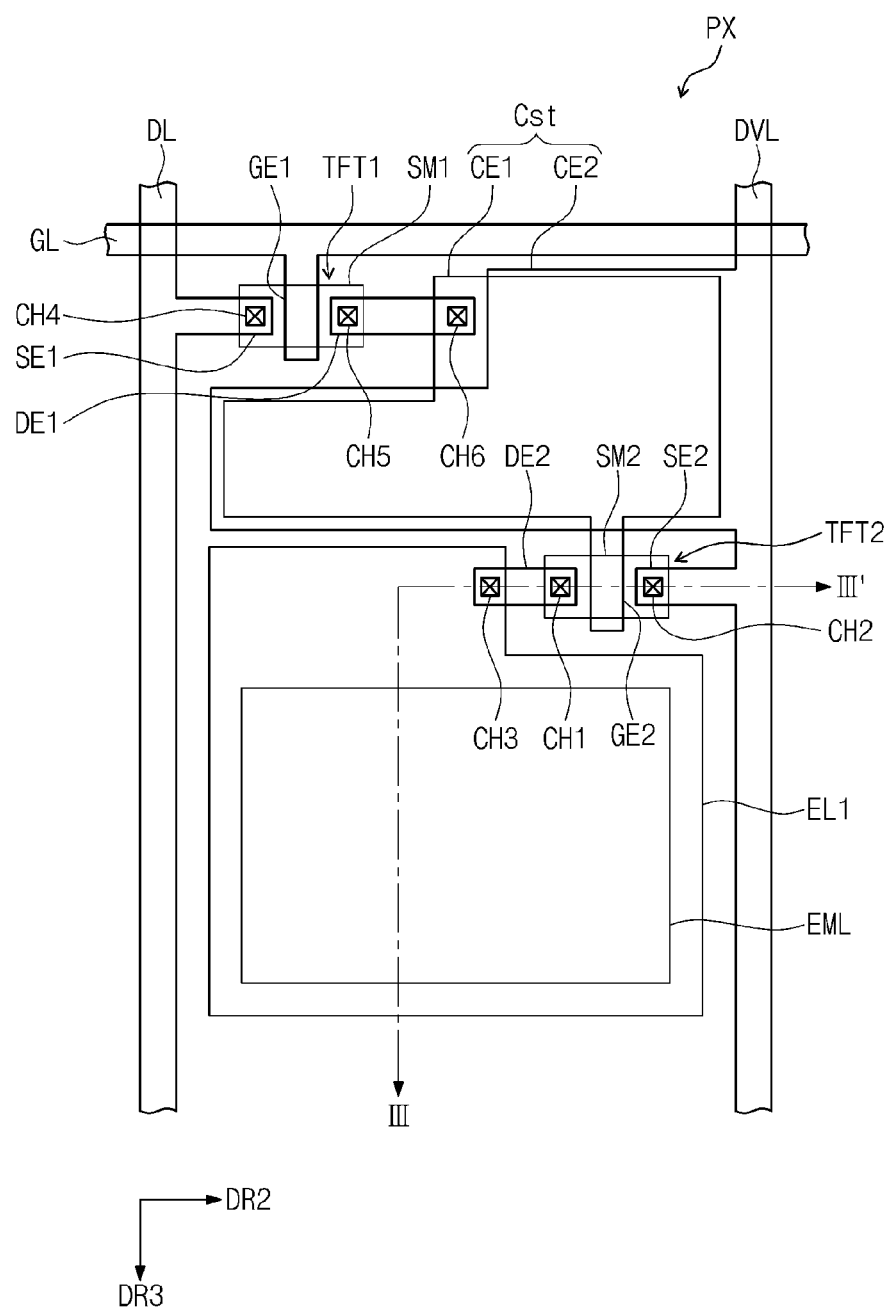
FIG. 5B is a plan view of one pixel included in a display panel included in a display device according to an exemplary embodiment of the inventive concept.
Figure 5C:
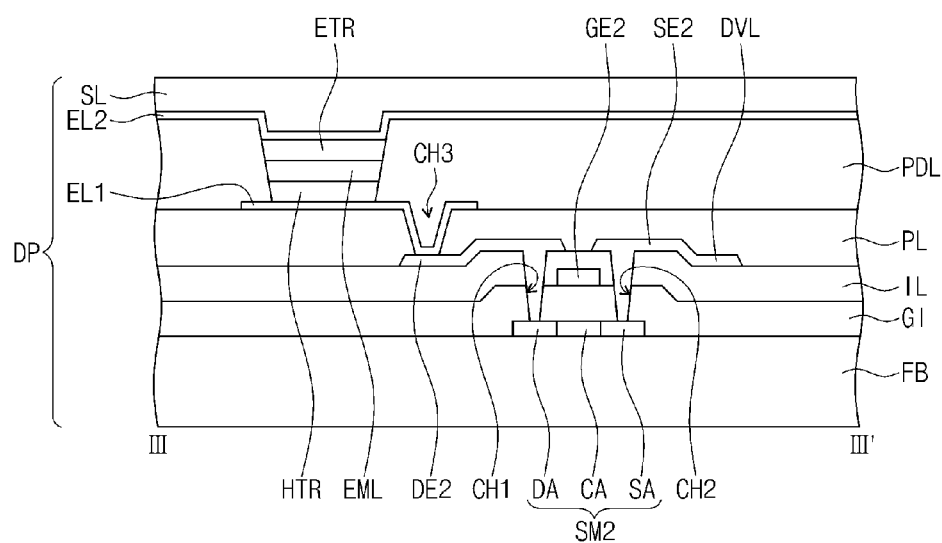
FIG. 5C is a schematic cross-sectional view of a display device according to an exemplary embodiment of the inventive concept corresponding to line in FIG. 5B.

FIG. 5A is a circuit diagram of one pixel included in a display panel included in a display device according to an exemplary embodiment of the inventive concept. FIG. 5B is a plan view of one pixel included in a display panel included in a display device according to an exemplary embodiment of the inventive concept. FIG. 5C is a schematic cross-sectional view of a display device according to an exemplary embodiment of the inventive concept corresponding to line in FIG. 5B.

Referring to FIGS. 5A and 5B, each of pixels PX may be connected to a wiring part composed of gate lines GL, data lines Dl, and driving voltage lines DVL. Each of the pixels PX includes thin film transistors TFT1 and TFT2, an organic light-emitting device (OEL) connected with the thin film transistors TFT1 and TFT2, and a capacitor Cst.

In an exemplary embodiment of the inventive concept, one pixel is connected with one gate line, one data line and one driving voltage line. However, the inventive concept is not limited thereto, and a plurality of the pixels may be connected with one gate line, one data line and one driving voltage line. In addition, one pixel may be connected with at least one gate line, at least one data line, and at least one driving voltage line.

The gate lines GL extend in a second direction DR2. The data lines DL extend in a third direction DR3 which crosses the gate lines GL. The driving voltage lines DVL extend in the third direction DR3 which is substantially the same direction as that of the data lines DL. The gate lines GL transfer scanning signals to the thin film transistors TFT1 and TFT2, the data lines DL transfer data signals to the thin film transistors TFT1 and TFT2, and the driving voltage lines DVL provide a driving voltage to the thin film transistors TFT1 and TFT2.

Each of the pixels may emit light with specific color, for example, one of red light, green light, or blue light. The kind of the color light is not limited thereto and may further include, for example, white light, cyan light, magenta light or yellow light.

The thin film transistors TFT1 and TFT2 may include a driving thin film transistor TFT2 for controlling the organic light-emitting device OEL and a switching thin film transistor TFT1 for switching the driving thin film transistor TFT2. In an exemplary embodiment of the inventive concept, each of the pixels PX includes two thin film transistors TFT1 and TFT2. However, the inventive concept is not limited thereto. Each of the pixels PX may include one thin film transistor and one capacitor, and each of the pixels PX may be disposed with three or more thin film transistors and two or more capacitors.

The switching thin film transistor TFT1 includes a first gate electrode GE1, a first source electrode SE1, and a first drain electrode DE1. The first gate electrode GE1 is connected with the gate line GL, and the first source electrode SE1 is connected with the data line DL. The first drain electrode DE1 is connected with a first common electrode CE1 via a fifth contact hole CH5. The switching thin film transistor TFT1 transfers data signals applied to the data line DL according to scanning signals applied to the gate line GL to the driving thin film transistor TFT2.

The driving thin film transistor TFT2 includes a second gate electrode GE2, a second source electrode SE2, and a second drain electrode DE2. The second gate electrode GE2 is connected with the first common electrode CE1. The second source electrode SE2 is connected with the driving voltage lines DVL. The second drain electrode DE2 is connected with an anode EL1 via a third contact hole CH3.

The anode EL1 is connected with the second drain electrode DE2 of the driving thin film transistor TFT2. A common voltage is applied to the cathode EL2, and an emission layer EML emits light according to the output signals of the driving thin film transistor TFT2 to display images. The anode EL1 and the cathode EL2 will be explained in more detail below.

The capacitor Cst is connected between the second gate electrode GE2 and the second source electrode SE2 of the driving thin film transistor TFT2, and charges and maintains the data signals inputted to the second gate electrode GE2 of the driving thin film transistor TFT2. The capacitor Cst may include the first common electrode connected with the first drain electrode DE1 via a sixth contact hole CH6, and the second common electrode CE2 connected with the first common electrode CE1 and the driving voltage lines DVL.

Referring to FIGS. 5A to 5C, a flexible substrate FB may be any one commonly used, without limitation, and may include, for example, plastics, organic polymers, etc. The organic polymer forming the flexible substrate FB may include polyethylene terephthalate (PET), polyethylene naphthalate (PEN), polyimide, polyethersulfone, etc. The flexible substrate FB may be selected in consideration of mechanical strength, thermal stability, transparency, surface smoothness, easy of handling, waterproofing property, etc. The flexible substrate FB may be transparent.

On the flexible substrate FB, a substrate buffer layer (not shown) may be provided. The substrate buffer layer (not shown) prevents the diffusion of impurities to the switching thin film transistor TFT1 and the driving thin film transistor TFT2. The substrate buffer layer (not shown) may be formed using silicon nitride ($SiN_x$), silicon oxide ($SiO_x$), silicon oxynitride ($SiO_xN_y$), etc., and may be omitted according to the material of the flexible substrate FB and process conditions.

On the flexible substrate FB, a first semiconductor pattern SM1 and a second semiconductor pattern SM2 are disposed. The first semiconductor pattern SM1 and the second semiconductor pattern SM2 are formed using a semiconductor material and are operated as an active layer of each of the switching thin film transistor TFT1 and the driving thin film transistor TFT2. Each of the first semiconductor pattern SM1 and the second semiconductor pattern SM2 may include a source part SA, a drain part DA and a channel part CA disposed between the source part SA and the drain part DA. Each of the first semiconductor pattern SM1 and the second semiconductor pattern SM2 may be formed by selecting an inorganic semiconductor or an organic semiconductor. A source part SA and a drain part DA may be doped with n-type impurities or p-type impurities.

On the first semiconductor pattern SM1 and the second semiconductor pattern SM2, a gate insulating layer GI is disposed. The gate insulating layer GI covers the first semiconductor pattern SM1 and the second semiconductor pattern SM2. The gate insulating layer GI may be formed using an organic insulating material or an inorganic insulating material.

On the gate insulating layer GI, a first gate electrode GE1, and a second gate electrode GE2 are disposed. Each of the first gate electrode GE1 and the second gate electrode GE2 may be formed to cover a corresponding region to the drain part DA of the first semiconductor pattern SM1 or the second semiconductor pattern SM2.

On the first gate electrode GE1 and the second gate electrode GE2, a substrate insulating layer IL is disposed. The substrate insulating layer IL covers the first gate electrode GE1 and the second gate electrode GE2. The substrate insulating layer IL may be formed using an organic insulating material or an inorganic insulating material.

On the substrate insulating layer IL, the first source electrode SE1, the first drain electrode DE1, the second source electrode SE2 and the second drain electrode DE2 are disposed. The second drain electrode DE2 makes contact with the drain part DA of the second semiconductor pattern SM2 via a first contact hole CH1 formed in the gate insulating layer GI and the substrate insulating layer IL, and the second source electrode SE2 makes contact with the source part SA of the second semiconductor pattern SM2 via a second contact hole CH2 formed in the gate insulating layer GI and the substrate insulating layer IL. The first source electrode SE1 makes contact with the source part (not shown) of the first semiconductor pattern SM1 via a fourth contact hole CH4 formed in the gate insulating layer GI and the substrate insulating layer IL, and the first drain electrode DE1 makes contact with the drain part (not shown) of the first semiconductor pattern SM1 via a fifth contact hole CH5 formed in the gate insulating layer GI and the substrate insulating layer IL.

A passivation layer PL is disposed on the first source electrode SE1, the first drain electrode DE1, the second source electrode SE2, and the second drain electrode DE2. The passivation layer PL may play the role of passivating the switching thin film transistor TFT1 and the driving thin film transistor TFT2, or may play the role as a planarizing layer for planarizing the top surface thereof.

On the passivation layer PL, an anode EL1 is disposed. The anode EL1 may be, for example, a positive electrode. The anode EL1 is connected with the second drain electrode DE2 of the driving thin film transistor TR2 via a third contact hole CH3 formed in the passivation layer PL.

On the passivation layer PL, a pixel defining layer PDL partitioning the emission layer EML corresponding to each of the pixels PX is disposed. The pixel defining layer PDL exposes the top surface of the anode EL1 and is extruded from the flexible substrate FB. The pixel defining layer PDL may include a metal-fluorine ion compound, without limitation. For example, the pixel defining layer PDL may be formed using at least one metal-fluorine ion compound of LiF, $BaF_2$ or CsF. In the case where the metal-fluorine ion compound has a thickness greater than a predetermined specified thickness, an insulating property may be disposed. The thickness of the pixel defining layer PDL may be in a range of, for example, from about 10 nm to about 100 nm.

A region surrounded by the pixel defining layer PDL is disposed with an organic light-emitting device OEL. The organic light-emitting device OEL includes an anode EL1, a hole transport region HTR, an emission layer EML, an electron transport region ETR, and a cathode EL2.

The anode EL1 is conductive. The anode EL1 may be a pixel electrode or a positive electrode. The anode EL1 may be a transmissive electrode, a transflective electrode, or a reflective electrode. In the case where the anode EL1 is the transmissive electrode, the anode EL1 may be formed using a transparent metal oxide, for example, ITO, IZO, ZnO, ITZO, etc. In the case where the anode EL1 is the transflective electrode or the reflective electrode, the anode EL1 may include at least one of Al, Cu, Ti, Mo, Ag, Mg, Pt, Pd, Au, Ni, Nd, Ir, or Cr.

An organic layer is disposed on the anode EL1, and includes an emission layer EML. The organic layer may further include a hole transport region HTR and an electron transport layer ETR.

The hole transport region HTR is disposed on the anode EL1. The hole transport region HTR may include at least one of a hole injection layer, a hole transport layer, a buffer layer, or an electron blocking layer. The hole transport region HTR may have a single layer formed using a single material, a single layer formed using a plurality of different materials, or a multilayer having a plurality of layers formed using a plurality of different materials.

For example, the hole transport region HTR may have a structure of a single layer formed using a plurality of different materials, or a structure laminated from the anode EL1 of hole injection layer/hole transport layer, hole injection layer/hole transport layer/buffer layer, hole injection layer/buffer layer, hole transport layer/buffer layer, or hole injection layer/hole transport layer/electron blocking layer, without limitation.

When the hole transport region HTR includes the hole injection layer, the hole transport region HTR may include a phthalocyanine compound, such as copper phthalocyanine, N,N'-diphenyl-N,N'-bis-[4-(phenyl-m-tolyl-amino)-phenyl]-biphenyl-4,4'-diamine (DNTPD), 4,4',4"-tris(3-methylphenylphenylamino)triphenylamine (m-MTDATA), 4,4',4"-tris(N,N-diphenylamino)triphenylamine (TDATA), 4,4',4"-tris{N-(2-naphthyl)-N-phenylamino}-triphenylamine (2-TNATA), poly(3,4-ethylenedioxythiophene)/poly(4-styrenesulfonate) (PEDOT/PSS), polyaniline/dodecylbenzenesulfonic acid (PANI/DBSA), polyaniline/camphor sulfonic acid (PANI/CSA), polyaniline/poly(4-styrenesulfonate) (PANI/PSS), etc., without limitation.

When the hole transport region HTR includes the hole transport layer, the hole transport region HTR may include a carbazole derivative such as N-phenylcarbazole and polyvinyl carbazole, a fluorine-based derivative, N,N'-bis(3-methylphenyl)-N,N'-diphenyl-[1,1-biphenyl]-4,4'-diamine (TPD), a triphenylamine-based derivative such as 4,4',4"-tris(N-carbazolyl)triphenylamine (TCTA), N,N'-di(1-naphthyl)-N,N'-diphenylbenzidine (NPB), 4,4'-cyclohexylidene bis[N,N-bis(4-methylphenyl)benzeneamine] (TAPC), etc., without limitation.

The emission layer EML may be disposed on the hole transport region HTR. The emission layer EML may include a single layer formed using a single material, a single layer formed using a plurality of different materials, or a multilayer structure having a plurality of layers formed using a plurality of different materials.

The emission layer EML may be formed using a commonly used material, without limitation, and may include, for example, materials emit red light, green light, or blue light. The emission layer EML may include a phosphorescent material or a fluorescent material. In addition, the emission layer EML may include a host or a dopant.

The host may be any materials commonly used without specific limitation and may include, for example, tris(8-hydroxyquinolino)aluminum (Alq3), 4,4'-bis(N-carbazolyl)-1,1'-biphenyl (CBP), poly(n-vinylcarbazole) (PVK), 9,10-di(naphthaline-2-yl)anthracene (ADN), 4,4',4"-tris(carbazole-9-yl)-triphenylamine (TCTA), 1,3,5-tris(N-phenylbenzimidazole-2-yl)benzene (TPBi), 3-tert-butyl-9,10-di(naphth-2-yl)anthracene (TBADN), distyrylarylene (DSA), 4,4'-bis(9-carbazolyl)-2,2'-dimethyl-biphenyl (CDBP), 2-methyl-9,10-bis(naphthalen-2-yl)anthracene (MADN), etc.

When the emission layer EML emits red light, the emission layer EML may include a phosphorescent material including, for example, tris(dibenzoylmethanato)phenanthroline europium (PBD:Eu(DBM)3(Phen)), or perylene. When the emission layer EML emits red light, the dopant included in the emission layer EML may be selected from a metal complex or an organometallic complex such as bis(1-phenylisoquinoline)acetylacetonate iridium (PIQIr(acac)), bis(1-phenylquinoline)acetylacetonate iridium (PQIr(acac)), tris(1-phenylquinoline)iridium (PQIr), and octaethylporphyrin platinum (PtOEP).

When the emission layer EML emits green light, the emission layer EML may include a phosphorescent material including, for example, tris(8-hydroxyquinolino)aluminum (Alq3). When the emission layer EML emits green light, the dopant included in the emission layer EML may be selected from a metal complex such as fac-tris(2-phenylpyridine) iridium (Ir(ppy)3) or an organometallic complex.

When the emission layer EML emits blue light, the emission layer EML may further include a phosphorescent material including at least one selected from the group consisting of, for example, spiro-DPVBi, spiro-6P, distyrylbenzene (DSB), distyryl-arylene (DSA), a polyfluorene (PFO)-based polymer, and a poly(p-phenylene vinylene) (PPV)-based polymer. When the emission layer EML emits blue light, the dopant included in the emission layer EML may be selected from a metal complex such as (4,6-F2ppy)$_2$Irpic or an organometallic complex. The emission layer EML will be described in particular later.

The electron transport region ETR is disposed on the emission layer EML. The electron transport region may include at least one of an electron blocking layer, an electron transport layer, and an electron injection layer, without limitation.

When the electron transport region includes the electron transport layer, the electron transport region may include tris(8-hydroxyquinolinato)aluminum (Alq3), 1,3,5-tri(1-phenyl-1H-benzo[d]imidazol-2-yl)phenyl (TPBi), 2,9-dimethyl-4,7-diphenyl-1,10-phenanthroline (BCP), 4,7-diphenyl-1,10-phenanthroline (Bphen), 3-(4-biphenylyl)-4-phenyl-5-tert-butylphenyl-1,2,4-triazole (TAZ), 4-(naphthalen-1-yl)-3,5-diphenyl-4H-1,2,4-triazole (NTAZ), 2-(4-biphenylyl)-5-(4-tert-butylphenyl)-1,3,4-oxadiazole (tBu-PBD), bis(2-methyl-8-quinolinolato-N1,O8)-(1,1'-biphenyl-4-olato)aluminum (BAlq), berylliumbis(benzoquinolin-10-olate (Bebq2), 9,10-di(naphthalene-2-yl)anthracene (ADN), or a mixture thereof, without limitation.

When the electron transport region includes the electron injection layer, the electron transport region may include LiF, lithium quinolate (LiQ), Li$_2$O, BaO, NaCl, CsF, a metal in lanthanoides such as Yb, or a metal halide such as RbCl and RbI, without limitation. The electron injection layer also may be formed using a mixture material of a hole transport material and an insulating organo metal salt. The organo metal salt may be a material having an energy band gap of about 4 eV or more. Particularly, the organo metal salt may include, for example, a metal acetate, a metal benzoate, a metal acetoacetate, a metal acetylacetonate, or a metal stearate. The thickness of the electron injection layer may be in a range from about 1 Å to about 100 Å, and also from about 3 Å to about 90 Å. When the thickness of the electron injection layer satisfies the above described range, satisfactory electron injection properties may be obtained without inducing the substantial increase of a driving voltage.

The cathode EL2 may be disposed on the electron transport region ETR. The cathode EL2 may be a common electrode or a negative electrode. The cathode EL2 may be a transmissive electrode, a transflective electrode, or a reflective electrode. When the cathode EL2 is the transmissive electrode, the cathode EL2 may include Li, Ca, LiF/Ca, LiF/Al, Mg, BaF, Ba, Ag, a compound thereof, or a mixture thereof (for example, a mixture of Ag and Mg).

When the cathode EL2 is the transflective electrode or the reflective electrode, the cathode EL2 may include Ag, Mg, Cu, Al, Pt, Pd, Au, Ni, Nd, Ir, Cr, Li, Ca, LiF/Ca, LiF/Al, Mo, Ti, a compound thereof, or a mixture thereof (for example, a mixture of Ag and Mg). The cathode EL2 may have a multilayered structure including a reflective layer or a transflective layer formed using the above-described Ag, Mg, Cu, Al, Pt, Pd, Au, Ni, Nd, Ir, Cr, Li, Ca, LiF/Ca, LiF/Al, Mo, Ti, a compound thereof, or a mixture thereof and a transparent conductive layer formed using ITO, IZO, ZnO, ITZO, etc.

The cathode EL2 may be connected with an auxiliary electrode. The auxiliary electrode may include a layer formed by depositing Ag, Mg, Cu, Al, Pt, Pd, Au, Ni, Nd, Ir, Cr, Li, Ca, LiF/Ca, LiF/Al, Mo, Ti, a compound thereof, or a mixture thereof, and a transparent metal oxide formed thereon using, for example, ITO, IZO, ZnO, ITZO, Mo, Ti, etc.

When the organic light-emitting device OEL is a top emission type, the anode EL1 may be a reflective electrode, and the cathode EL2 may be a transmissive electrode or a transflective electrode. When the organic light-emitting device OEL is a bottom emission type, the anode EL1 may be a transmissive electrode or a transflective electrode, and the cathode EL2 may be a reflective electrode.

In the organic light-emitting device OEL, according to the application of voltages to each of the anode EL1 and the cathode EL2, holes injected from the anode EL1 may transfer via the hole transport region HTR to the emission layer EML, and electrons injected from the cathode EL2 may transfer via the electron transport region ETR to the emission layer EML. The electrons and the holes are recombined in the emission layer EML to generate excitons, and the excitons may emit light via transition from an excited state to a ground state.

On the cathode EL2, a sealing layer SL is disposed. The sealing layer SL covers the cathode EL2. The sealing layer SL may include at least one of an organic layer or an inorganic layer. The sealing layer SL may be, for example, a thin film sealing layer. The sealing layer SL passivates the organic light-emitting device OEL.

Referring to FIGS. 2A to 2C, 3A to 3C, 4A, 4B, and 5A to 5C, the touch sensing unit TSU is disposed on the sealing layer SL. In an exemplary embodiment, the touch sensing unit TSU makes contact with the sealing layer SL. However, the inventive concept is not limited thereto, and a separate layer, such as an adhesive layer, may be disposed between the touch sensing unit TSU and the sealing layer SL.

Referring to FIGS. 2A to 2C, 4A, 4B, and 5A to 5C, the first sensing electrodes Tx may be disposed on the sealing layer SL or make contact with the sealing layer SL. The insulating layer INL is disposed on the sealing layer SL and the first sensing electrodes Tx and makes contact with the sealing layer SL and each of the first sensing electrodes Tx. More particularly, the first inorganic insulating layer IOL1 is disposed on the sealing layer SL and the first sensing electrodes Tx and makes contact with the sealing layer SL and each of the first sensing electrodes Tx.

The first self-assembled monolayer SAML1 is disposed on the first inorganic insulating layer IOL1. The second inorganic insulating layer IOL2 is disposed on the first self-assembled monolayer SAML1. The second sensing electrodes Rx makes contact with the second inorganic insulating layer IOL2.

Referring to FIGS. 3A to 3C, 4A, 4B, and 5A to 5C, the insulating layer INL is disposed on the sealing layer SL, and makes contact with the sealing layer SL. More particularly, the first inorganic insulating layer IOL1 is disposed on the sealing layer SL, and makes contact with the sealing layer SL. The first self-assembled monolayer SAML1 is disposed on the first inorganic insulating layer IOL1. The second inorganic insulating layer IOL2 is disposed on the first self-assembled monolayer SAML1. Each of the first sensing electrodes Tx and the second sensing electrodes Rx makes contact with the second inorganic insulating layer IOL2.

A touch sensing unit included in a typical display device of the prior art does not include a first self-assembled monolayer in an inorganic insulating layer, and in the case where cracks are generated due to bending, the cracks may propagate to the entire inorganic insulating layer.

However, the touch sensing unit included in the display device according to an exemplary embodiment of the inventive concept includes a first self-assembled monolayer disposed between a first inorganic insulating layer and a second inorganic insulating layer. Accordingly, even when cracks are generated in the first inorganic insulating layer or the second inorganic insulating layer, the first self-assembled monolayer may prevent the propagation of the cracks. Therefore, the touch sensing unit according to an exemplary embodiment may have high durability.

In addition, the touch sensing unit included in the display device according to an exemplary embodiment uses the first self-assembled monolayer as an organic insulating layer, and may have a decreased thickness of the insulating layer when compared to a case when using an organic insulating layer other than the first self-assembled monolayer.

Hereinafter, a method of fabricating a touch sensing unit according to an exemplary embodiment will be explained. Hereinafter, parts other than, or in addition to, the touch sensing unit according to the previously-described exemplary embodiment will be mainly be described.

Figure 6:
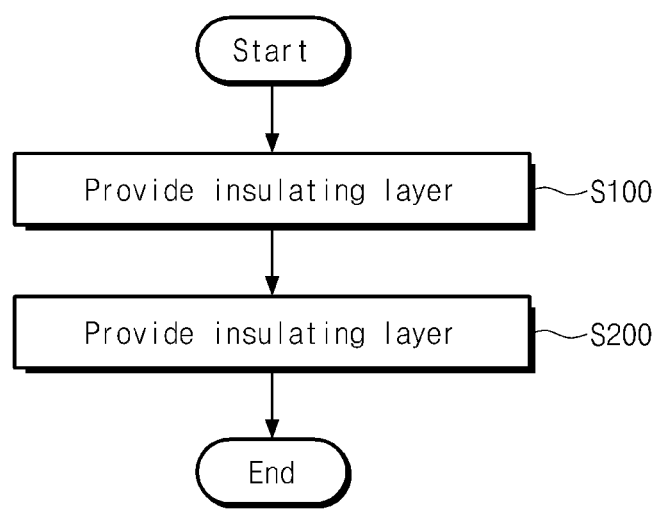
FIG. 6 is a flowchart schematically illustrating a f method of fabricating a touch sensing unit according to an exemplary embodiment of the inventive concept.

FIG. 6 is a flowchart schematically illustrating a method of fabricating a touch sensing unit according to an exemplary embodiment of the inventive concept.

Referring to FIGS. 1A, 1B, 2A to 2C, 3A to 3C and 6, a method of fabricating a touch sensing unit TSU according to an exemplary embodiment includes a step of forming an insulating layer INL (S100), and a step of forming a conductive pattern CP making contact with the insulating layer INL (S200). The step of forming the insulating layer INL (S100) includes a step of forming a first inorganic insulating layer IOL1, and a step of forming a first self-assembled monolayer SAML1 on the first inorganic insulating layer IOL1 and a second inorganic insulating layer IOL2 on the first self-assembled monolayer SAML1.

FIGS. 7A to 7E are cross-sectional views illustrating a method of fabricating a touch sensing unit according to an exemplary embodiment of the inventive concept.

Referring to FIGS. 2A, 2B, 6 and 7A to 7E, the step of forming the conductive pattern CP (S200) includes a step of forming first sensing electrodes Tx and a step of forming second sensing electrodes Rx on the insulating layer INL. In the step of forming the insulating layer INL (S100), the insulating layer INL may be formed on the first sensing electrodes Tx.

Figure 7A:
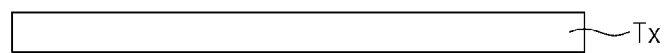
FIG. 7A, FIG. 7B, FIG. 7C, FIG. 7D, and FIG. 7E are cross-sectional views illustrating a method of fabricating a touch sensing unit according to an exemplary embodiment of the inventive concept.
Figure 7B:

Referring to FIG. 7A, first sensing electrodes Tx are formed. Referring to FIG. 7B, a first inorganic insulating layer IOL1 is formed on the first sensing electrodes Tx. The first inorganic insulating layer IOL1 may be formed, for example, by depositing a first inorganic insulating material. The thickness of the first inorganic insulating layer IOL1 may be in a range of, for example, about 100 nm to about 3,000 nm. The first sensing electrodes Tx make contact with the first inorganic insulating layer IOL1. The first sensing electrodes Tx are covered with the first inorganic insulating layer IOL1.

Figure 7C:
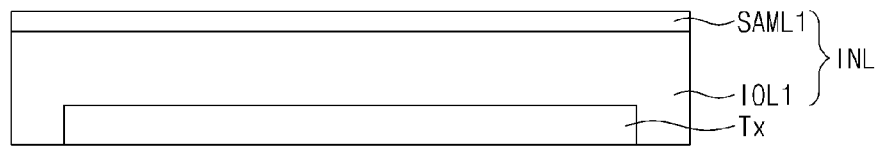

Referring to FIG. 7C, a first self-assembled monolayer SAML1 is formed on the first inorganic insulating layer IOL1. The first self-assembled monolayer SAML1 may be formed by, for example, via a deposition process.

The first self-assembled monolayer SAM1 may include silicon. The first self-assembled monolayer SAML1 may include a silane compound. The first self-assembled monolayer SAML1 may include any materials commonly used, without limitation, and may include, for example, at least one of (3-aminopropyl)trimethoxysilane (APS), 11-mercaptoundecanoic acid (MUA), (3-trimethoxysilylpropyl)diethylenetriamine (DET), N-(2-aminoethyl)-3-aminopropyltrimethoxysilane (EDA), perfluorodecyltrichlorosilane (PFS), octadecyltrichlorosilane (OTS), octadecyltrimethoxysilane (OTMS), 1-Hexadecanethiol (HDT), (heptadecafluoro-1,1,2,2,-tetrahydrodecyl)trichlorosilane (FDTS), 1H,1H,2H,2H-perfluorodecyltrichlorosilane-perfluorodecyltrichlorosilane (FOTS), pentafluorobenzenethiol (PFBT), or dichlorodimethylsilane (DDMS).

The thickness of the first self-assembled monolayer SAML1 may be less than the thickness of the first inorganic insulating layer IOL1. The thickness of the first self-assembled monolayer SAML1 may be in a range of, for example, about 1 nm to about 10 nm.

Figure 7D:
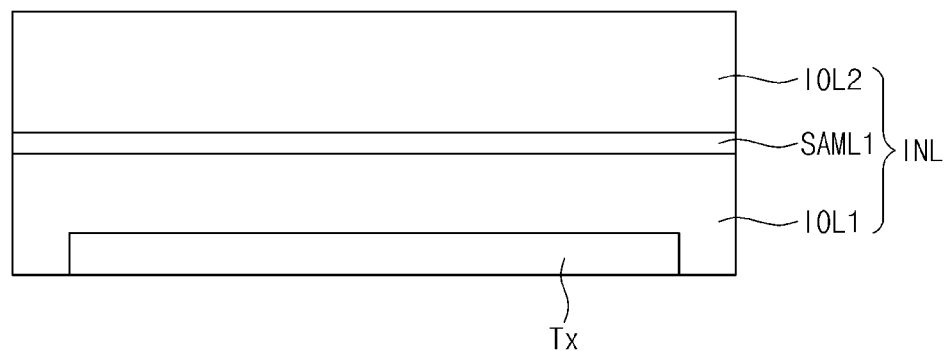

Referring to FIG. 7D, a second inorganic insulating layer IOL2 is formed on the first self-assembled monolayer SAML1. The second inorganic insulating layer IOL2 may be formed by, for example, depositing a second inorganic insulating material. The second inorganic insulating material may be the same as, or different from, the first inorganic insulating layer. The thickness of the second inorganic insulating layer IOL2 may be in a range of, for example, about 100 nm to about 3,000 nm.

Figure 7E:
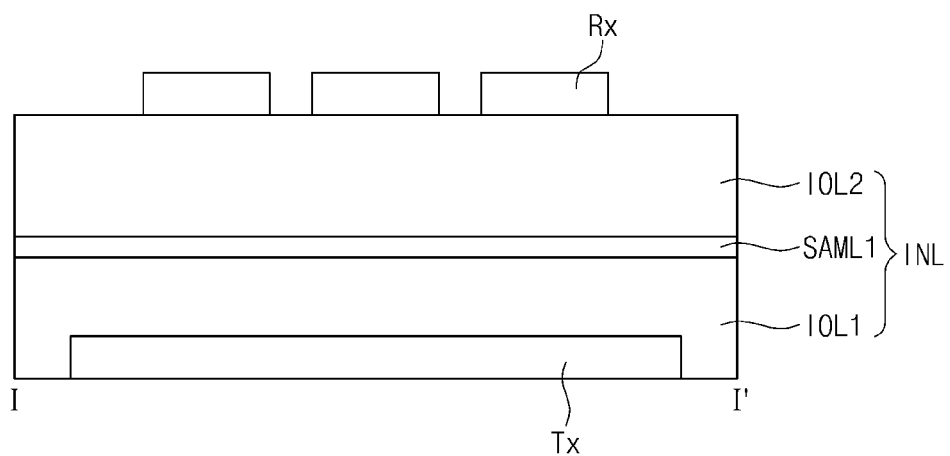

Referring to FIG. 7E, second sensing electrodes Rx may be formed on the second inorganic insulating layer IOL2. The second sensing electrodes Rx make contact with the second inorganic insulating layer IOL2.

FIGS. 8A to 8D are cross-sectional views illustrating a method of fabricating a touch sensing unit according to an exemplary embodiment of the inventive concept.

Referring to FIGS. 3A, 3B, 6, and 8A to 8D, the step of forming the conductive pattern CP may include a step of forming first sensing electrodes Tx on an insulating layer INL, and a step of forming second sensing electrodes Rx on the insulating layer INL so as to be separated from the first sensing electrodes Tx on the same plane.

Figure 8A:
FIG. 8A, FIG. 8B, FIG. 8C, and FIG. 8D are cross-sectional views illustrating a method of fabricating a touch sensing unit according to an exemplary embodiment of the inventive concept.

Referring to FIG. 8A, a first inorganic layer IOL1 is formed. The first inorganic insulating layer IOL1 includes a first inorganic insulating material. The thickness of the first inorganic insulating layer IOL1 may be greater than the thickness of a first self-assembled monolayer SAML1. The thickness of the first inorganic insulating layer IOL1 may be in a range of, for example, about 100 nm to about 3,000 nm.

Figure 8B:
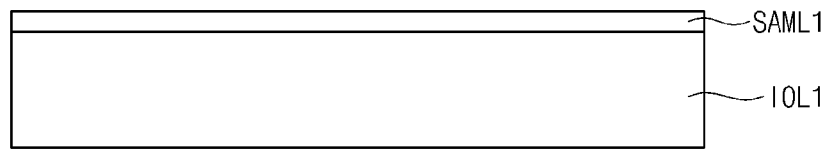

Referring to FIG. 8B, the first self-assembled monolayer SAML1 is formed on the first inorganic insulating layer IOL1. The first self-assembled monolayer SAM1 may include silicon. The first self-assembled monolayer SAML1 may include a silane compound. The first self-assembled monolayer SAML1 may include any materials commonly used, without limitation, and may include, for example, at least one of (3-aminopropyl)trimethoxysilane (APS), 11-mercaptoundecanoic acid (MUA), (3-trimethoxysilylpropyl)diethylenetriamine (DET), N-(2-aminoethyl)-3-aminopropyltrimethoxysilane (EDA), perfluorodecyltrichlorosilane (PFS), octadecyltrichlorosilane (OTS), octadecyltrimethoxysilane (OTMS), 1-Hexadecanethiol (HDT), (heptadecafluoro-1,1,2,2,-tetrahydrodecyl)trichlorosilane (FDTS), 1H,1H,2H,2H-perfluorodecyltrichlorosilane-perfluorodecyltrichlorosilane (FOTS), pentafluorobenzenethiol (PFBT), or dichlorodimethylsilane (DDMS).

The thickness of the first self-assembled monolayer SAML1 may be less than the thickness of the first inorganic insulating layer IOL1. The thickness of the first self-assembled monolayer SAML1 may be in a range of, for example, about 1 nm to about 10 nm.

Figure 8C:
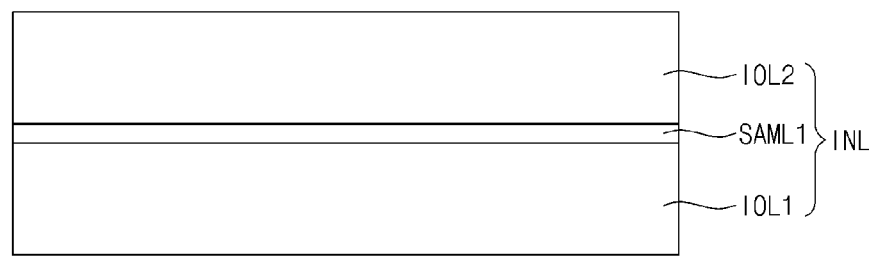

Referring to FIG. 8C, a second inorganic insulating layer IOL2 is formed on the first self-assembled monolayer SAML1. The second inorganic insulating layer IOL2 includes a second inorganic insulating material. The second inorganic insulating layer may be the same as, or different from, the first inorganic insulating material.

The thickness of the second inorganic insulating layer may be the same as, or different from, the thickness of the first inorganic insulating material. The thickness of the second inorganic insulating layer IOL2 may be greater than the thickness of the first self-assembled monolayer SAML1. The thickness of the second inorganic insulating layer IOL2 may be in a range of, for example, about 100 nm to about 3,000 nm.

Figure 8D:
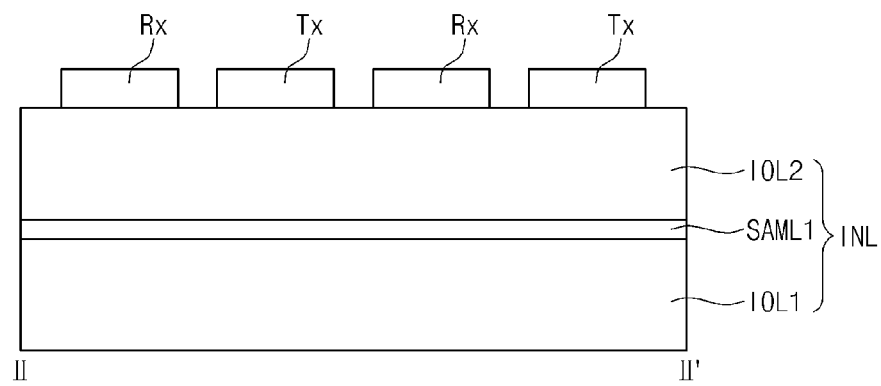

Referring to FIG. 8D, first sensing electrodes Tx and second sensing electrodes Rx may be formed on the second inorganic insulating layer IOL2. The first sensing electrodes Tx and the second sensing electrodes Rx are separated from each other on the same plane. Each of the first sensing electrodes Tx and the second sensing electrodes Rx makes contact with the second inorganic insulating layer IOL2.

A touch sensing unit manufactured by the method of fabricating a typical touch sensing unit of the prior art does not include a first self-assembled monolayer in an inorganic insulating layer, and in the case where cracks are generated due to bending, the cracks may propagate to the entire inorganic insulating layer.

However, the touch sensing unit manufactured by the fabrication method according to an exemplary embodiment of the inventive concept includes a first self-assembled monolayer between a first inorganic insulating layer and a second inorganic insulating layer. Accordingly, even when cracks are generated in the first inorganic insulating layer or the second inorganic insulating layer, the first self-assembled monolayer may prevent the propagation of the cracks. Therefore, the touch sensing unit according to an embodiment may have high durability.

In addition, the touch sensing unit manufactured by the fabrication method according to an exemplary embodiment uses the first self-assembled monolayer as an organic insulating layer, and may have a decreased thickness of the insulating layer when compared to a case when using an organic insulating layer other than the first self-assembled monolayer, as in the prior art.

According to the touch sensing unit of an exemplary embodiment of the inventive concept, the generation of cracks due to bending may be decreased.

According to the display device of an exemplary embodiment of the inventive concept, the propagation of cracks generated due to bending may be prevented, and a slim profile may be realized.

According to an exemplary embodiment of the inventive concept, a method of fabricating a touch sensing unit may be provided that is capable of realizing a slim profile and preventing the propagation of cracks generated due to bending.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A touch sensing unit, comprising:
an insulating layer; and
a conductive pattern making contact with the insulating layer,
wherein:
the insulating layer comprises:
a first inorganic insulating layer;
a first self-assembled monolayer (SAM) disposed on the first inorganic insulating layer; and
a second inorganic insulating layer disposed on the first self-assembled monolayer, wherein:
the thickness of the first self-assembled monolayer is less than the thickness of the first inorganic insulating layer and the thickness of the second inorganic insulating layer; and
the thickness of each of the first inorganic insulating layer and the second inorganic insulating layer is 100 nm to 3,000 nm.

2. The touch sensing unit of claim 1, wherein the first self-assembled monolayer comprises silicon.

3. The touch sensing unit of claim 1, wherein the first self-assembled monolayer comprises a silane compound.

4. The touch sensing unit of claim 1, wherein the first self-assembled monolayer comprises at least one of (3-aminopropyl)trimethoxysilane (APS), 11-mercaptoundecanoic acid (MUA), (3-trimethoxysilylpropyl)diethylenetriamine (DET), N-(2-aminoethyl)-3-aminopropyltrimethoxysilane (EDA), perfluorodecyltrichlorosilane (PFS), octadecyltrichlorosilane (OTS), octadecyltrimethoxysilane (OTMS), 1-Hexadecanethiol (HDT), (heptadecafluoro-1,1,2,2,-tetrahydrodecyl)trichlorosilane (FDTS), 1H,1H,2H,2H-perfluorodecyltrichlorosilane-perfluorodecyltrichlorosilane (FOTS), pentafluorobenzenethiol (PFBT), or dichlorodimethylsilane (DDMS).

5. The touch sensing unit of claim 1, wherein the conductive pattern comprises:
first sensing electrodes; and
second sensing electrodes separated from the first sensing electrodes,
the insulating layer being disposed on the first sensing electrodes,
the second sensing electrodes being disposed on the insulating layer.

6. The touch sensing unit of claim 1, wherein the conductive pattern comprises:
first sensing electrodes disposed on the insulating layer; and
second sensing electrodes disposed on the insulating layer and separated from the first sensing electrodes on a same plane.

7. The touch sensing unit of claim 1, wherein the conductive pattern makes contact with at least one of the first inorganic insulating layer and the second inorganic insulating layer.

8. The touch sensing unit of claim 1, wherein the insulating layer further comprises a second self-assembled monolayer disposed on the second inorganic insulating layer.

9. The touch sensing unit of claim 8, wherein the conductive pattern makes contact with at least one of the first inorganic insulating layer and the second self-assembled monolayer.

10. The touch sensing unit of claim 1, wherein the conductive pattern comprises at least one of:
a sensing electrode;
a pad part electrically connecting with the sensing electrode;
an interconnect wiring electrically connecting with the sensing electrode; and
a fanout wiring electrically connecting with the interconnect wiring and the pad part.

11. The touch sensing unit of claim 1, wherein at least a portion of the insulating layer or the conductive pattern is bent in a first mode or unbent in a second mode.

12. A display device, comprising
a display panel; and
a touch sensing unit disposed on the display panel,
wherein:
the touch sensing unit comprises:
an insulating layer; and
a conductive pattern making contact with the insulating layer; and
the insulating layer comprises:
a first inorganic insulating layer;
a first self-assembled monolayer (SAM) disposed on the first inorganic insulating layer; and
a second inorganic insulating layer disposed on the first self-assembled monolayer,
wherein:
the thickness of the first self-assembled monolayer is less than the thickness of the first inorganic insulating layer and the thickness of the second inorganic insulating layer; and
the thickness of each of the first inorganic insulating layer and the second inorganic insulating layer is 100 nm to 3,000 nm.

13. The display device of claim 12, wherein the conductive pattern comprises:
first sensing electrodes; and
second sensing electrodes separated from the first sensing electrodes,
wherein:
the insulating layer is disposed on the first sensing electrodes; and
the second sensing electrodes are disposed on the insulating layer.

14. The display device of claim 12, wherein the conductive pattern comprises:
first sensing electrodes disposed on the insulating layer; and
second sensing electrodes disposed on the insulating layer and separated from the first sensing electrodes on a same plane.

15. A method of fabricating a touch sensing unit, the method comprising:
forming an insulating layer; and
forming a conductive pattern making contact with the insulating layer,
wherein the forming of the insulating layer comprises:
forming a first inorganic insulating layer;
forming a first self-assembled monolayer on the first inorganic insulating layer; and
forming a second inorganic insulating layer on the first self-assembled monolayer,
wherein:
the thickness of the first self-assembled monolayer is less than the thickness of the first inorganic insulating layer and the thickness of the second inorganic insulating layer; and
the thickness of each of the first inorganic insulating layer and the second inorganic insulating layer is 100 nm to 3,000 nm.

16. The method of claim 15, wherein the first self-assembled monolayer comprises silicon.

17. The method of claim 15, wherein the first self-assembled monolayer comprises at least one of (3-aminopropyl)trimethoxysilane (APS), 11-mercaptoundecanoic acid (MUA), (3-trimethoxysilylpropyl)diethylenetriamine (DET), N-(2-aminoethyl)-3-aminopropyltrimethoxysilane (EDA), perfluorodecyltrichlorosilane (PFS), octadecyltrichlorosilane (OTS), octadecyltrimethoxysilane (OTMS), 1-Hexadecanethiol (HDT), (heptadecafluoro-1,1,2,2,-tetrahydrodecyl)trichlorosilane (FDTS), 1H,1H,2H,2H-perfluorodecyltrichlorosilane-perfluorodecyltrichlorosilane (FOTS), pentafluorobenzenethiol (PFBT), or dichlorodimethylsilane (DDMS).

18. The method of claim 15, wherein the forming of the conductive pattern comprises:
   forming first sensing electrodes; and
   forming second sensing electrodes on the insulating layer, the insulating layer being formed on the first sensing electrodes in the forming of the insulating layer.

19. The method of claim 15, wherein the forming of the conductive pattern comprises:
   forming first sensing electrodes on the insulating layer; and
   forming second sensing electrodes on the insulating layer so as to be separated from the first sensing electrodes on a same plane.

* * * * *